April 8, 1969
T. H. CLEVELAND 3,437,631
BODY PROTECTIVE DEVICE COMPOSED OF POLYCARBONATE
RESINS ADMIXED WITH POLYOLEFINS AND PIGMENTS
Filed Feb. 13, 1967
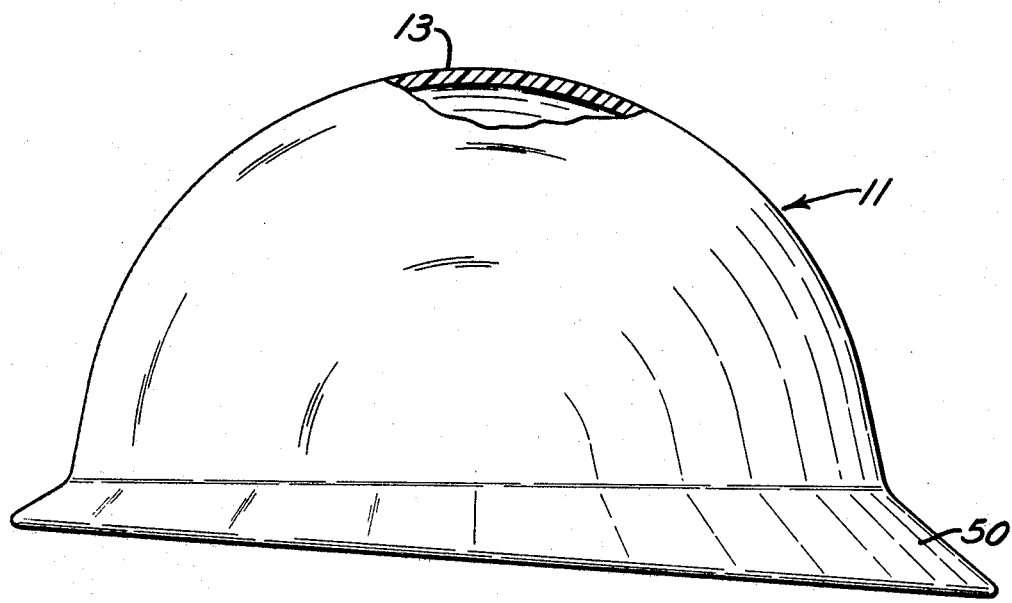
INVENTOR.
THOMAS H. CLEVELAND
BY
ATTORNEYS.

United States Patent Office 3,437,631
Patented Apr. 8, 1969

3,437,631
BODY PROTECTIVE DEVICE COMPOSED OF POLYCARBONATE RESINS ADMIXED WITH POLYOLEFINS AND PIGMENTS
Thomas H. Cleveland, New Martinsville, W. Va., assignor to Mobay Chemical Company, Pittsburgh, Pa., a corporation of Delaware
Filed Feb. 13, 1967, Ser. No. 615,499
Int. Cl. C08g 39/00; A42b 3/00
U.S. Cl. 260—37                                            8 Claims

ABSTRACT OF THE DISCLOSURE

A body protective shell having improved impact strength is prepared from a polycarbonate resin having incorporated therein from 3% to 7% of a polyolefin polymer.

---

This invention relates to protective shells such as riot shields, shin guards, helmets and the like. More particularly, it relates to body protective devices of polycarbonate plastics.

It is known that polycarbonate plastics exhibit high notched Izod (ASTM test D-256) impact values. This value, however, is dependent upon the thickness of the test specimen. Typical notched Izod impact values for a ⅛″ specimen is about 16 ft.-lbs. per in. These high Izod values result because specimen of ⅛″ thickness are less than the critical thickness of the polymer and therefore upon impact a hinged break occurs. On the other hand, ¼″ specimen exhibit a clean or brittle break and give notched Izod impact values of only about 2.5 ft.-lbs. per in. The ¼″ specimen are greater than the critical thickness of the polymer. "Critical thickness" has been defined as the thickness at which a discontinuity in Izod impact values occurs. In other words, it is the thickness at which a transition from a brittle to a hinged break or vice versa occurs. Thus a standard impact specimen of polycarbonate polymer thicker than the critical thickness exhibits brittle breaks and those thinner than the critical thickness exhibit hinged or ductile breaks.

This critical thickness of polycarbonate polymers causes serious problems should a safety device such as a helmet, be made of the polymer because the critical thickness varies as a function of time, molecular weight, method of test and also as a function of the thermal history of the polymer. For example, safety helmets injection molded of a freshly prepared polycarbonate may be of a thickness less than the critical thickness shortly after molding, however, at some period of time later in its life, the polymer changes, for example, by crystallization, and the critical thickness decreases to a point where the helmet having the same physical dimensions as originally molded is now greater than the critical thickness of the polymer. This could very readily result in a hazardous condition because one would be unaware from day to day when his particular safety device passes through the critical thickness value of the polymer.

The critical thickness of a molded polycarbonate article not only varies with time but also with the molecular weight of the particular polycarbonate. For example, in order to achieve satisfactory helmets consistently with as small a percentage of failures as possible, it has been necessary to mold polycarbonate polymers of a molecular weight of about 37,000 to 40,000. While polycarbonate polymers of a molecular weight of from 34,000 to 37,000 can be used, the percent that fail impact tests after accelerated aging is so high as to render the use of such polymers totally unfeasible. Helmets prepared from polycarbonate polymers having a molecular weight less than 30,000 consistently fail the impact test after accelerated aging.

In the fabrication of body protective devices such as those set out above, it has always been required that the device be of a thickness less than the critical thickness of the polymer in order to insure high impact values. This is further complicated by the requirement that the polymer be dyed or pigmenttd to give the color desired by the manufacturer of the particular device. For example, in the fabrication of safety helmets for baseball or football players, each team requires a different color or shade to match its uniforms. Another example is in industrial applications where different classification of workers in mills, plants, factories and the like wear different color hard hats in order to designate the classification to which they belong. This coloring of the polymer results in even more serious problems from an impact standpoint because while other properties of polymers are increased generally by the addition of fillers and pigments, impact values of polycarbonate polymers may be seriously reduced. As a result of the problem set out above with regard to variations in critical thickness because of time and molecular weight the requirement that the polymer be colored further aggravates the problem because of the resulting decrease in impact strength. Upon aging of the helmets at higher temperatures for a period of time (this procedure is designed to simulate actual use of the helmet over a period of years but at an accelerated time cycle) even a higher percentage of rejects is obtained.

It is therefore an object of this invention to provide an improved body protective device. It is another object of this invention to provide an improved polycarbonate safety helmet shell. It is a further object of this invention to provide a body protective device of polycarbonate, the critical thickness of which does not vary substantially as a function of time and molecular weight. It is still another object of this invention to provide pigmented polycarbonate safety helmets having high Izod impact values. It is a further object of this invention to provide polycarbonate body protective devices that have a long life and exhibit a high impact value over this life from polycarbonate polymers having a molecular weight less than 35,000.

The foregoing objects and others which will become apparent from the following description and the accompanying drawing are accomplished in accordance with the invention generally speaking, by providing a shell for a body protective device of a polycarbonate resin having incorporated therein from about 0.2 to about 5% of a pigment or pigments and from about 3% to about 7% of a polyolefin polymer, the polycarbonate resin containing the pigment and the polyolefin polymer having a critical thickness after an accelerated aging period of 15 hours at 250° F. of at least ¼″, the polycarbonate resin having a molecular weight of from about 25,000 to about 40,000, and the shell having an average thickness of from about 0.02″ to about 0.2″, preferably about 0.08″ to about 0.1″.

As set forth above, many problems existed in the preparation of body protective devices of polycarbonate resins because of the variation in critical thickness with respect to molecular weight and to the life of the particular molded article. Any time that the critical thickness of the polymer decreased to a value less than the actual thickness of the molded article, the impact strength of the molded article decreased so drastically as to result in brittle breaks. This property also prevents the use of polycarbonates having molecular weights less than about 35,000 because the critical thickness of such polymers is less than the required thickness for a body protective device. Thus, should such a polymer be used to prepare a molded safety helmet, for example, the device would be useless because it would not possess the necessary impact strength to provide the proper protection for the wearer.

In accordance with the invention, it is required that the polycarbonate-pigment-polyolefin combination has a critical thickness after an accelerated aging period of 15 hours at 250° F. of at least ¼". This condition is brought about by preparing the molded body protective device using from about 0.2 to about 5% and preferably about 0.2 to about 3% pigment and from 3 to 7% of a polyolefin in the polycarbonate. Further, by utilizing this combination, polycarbonate polymers of as low as 25,000 can be used to make high impact resistant body protective devices whereas in the past a molecular weight of 37,000 to 40,000 was required. A further advantage results in that in the past there was always a certain number of failures in the molded items regardless of the molecular weight used. This probably resulted because of the molding conditions at which the article was formed, i.e., the temperature and time. By preparing body protective devices in accordance with the invention, wide tolerances are obtained in the fabrication of the particular device without altering the critical thickness of the polymer composition.

In the preparation of polycarbonate compositions suitable for preparing the body protective devices in accordance with this invention, any suitable polyolefin may be used such as, for example, polyethylene, polypropylene, polybutylene, halogenated polyolefin mixtures and copolymers thereof, such as described in U.S. Patents Nos. 2,825,721, 2,905,646, 2,912,424, 2,915,514, 2,921,059, 2,949,447, 2,980,660, 2,981,723, 2,981,726, 2,989,516, 3,024,226, 3,024,227, 3,049,529 and 3,066,132.

Both high and low density polyethylene may be used. Low density polyethylenes of up to 0.925 gram/cc. are produced by the polymerization of ethylene at pressures in the range of 15,000 to about 45,000 p.s.i.g. and temperatures of from about 100° C. to about 300° C. in the presence of free radical catalysts such as oxygen or peroxides. High density polyethylenes range from 0.93 to 0.965 gram/cc. and are obtained from the polymerization of ethylene at moderate pressures and temperatures in a suitable solvent, and in the presence of a suitable catalyst. A polyethylene having a density of from about 0.93 to about 0.95 and a melt index of from about 0.6 to about 15 is preferred.

Any suitable polypropylene polymer may be used and preferably those having a melt index of from about 0.7 to about 15. These polypropylenes may be obtained in accordance with the procedure set forth in U.S. Patent No. 2,845,414 or in the manner described in the "Source Book of the New Plastics," volume 1, by Herbert R. Simonds, published by the Reinhold Publishing Corporation.

Any suitable butylene or isobutylene polymer may be used and preferably those having molecular weights greater than 75,000 and most preferably of from about 100,000 to about 200,000 and a density of from about 0.8 to about 1.2 grams/cc.

In addition to those mentioned above, halogenated polyolefins such as polychlorotrifluoroethylenes, polytetrafluoroethylenes and the like may be used either alone or in admixture with other polyolefins.

It is required by the industry that the body protective devices be colored and these colors are maintained within rigid standards. That is, the shade or hue cannot vary otherwise differences could be noticed from batch to batch. Therefore, the requirement of pigment loading to obtain desired colors creates a problem in the fabrication of body protective devices because of the lower impact values exhibited as a result of the incorporation of the pigment. The smallest amount of pigment possible to obtain the proper color is generally used. In the practice of this invention an amount greater than 5% by weight based on the polycarbonate resin used must be avoided because of its detrimental effect on the critical thickness of the resulting polymer. It is preferred that less than 3% pigment be used. Any suitable pigment may be used, such as, for example, white opaque pigments such as lead, zinc, titanium and antimony oxide pigments, red, maroon and brown inorganic pigments composed of the various oxides of iron; cadmium yellows, cadmium reds and cadmium maroons, such as cadmium sulfoselenides, cadmium sulfides, and the like, green pigments such as chrome greens, chromium oxides and the hydrated chromium oxides; blue pigments such as iron blues and ultramarine blues; carbon blacks, iron oxide blacks and the like. Particular examples of suitable pigments include Pigment Blue 15 (C.I. 74160), Diluted Black-PDS 161 B-192 (Kohnstamm), Solvent Violet 13 (C.I. 60725), Yellow 37 (C.I. 77199), Cadmium Red (C.I. 77196), Croton Fast Green Toner 4D-3600 (Harshaw Chemical Co.), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Brakenfeld), phthalocyanine pigments such as, for example, copper phthalocyanine (Monastral Fast Blue B or Heliogen Blue BA), chlorinated copper phthalocyanine (Monastral Fast Green G or Heliogen Green GA), sulfonated copper phthalocyanine, metal free phthalocyanine (Monastral Fast Blue G), and phthalocyanine derivatives in which one or more of the external hydrogen atoms are replaced by other groups such as halogen, alkyl, aryl, amino, nitro, substituted amino, sulfo, carboxy, alkoxy, aryloxy, thiocyano and the like.

The combination of the polycarbonate resin, the polyolefin and the pigment can be accomplished by any suitable technique known in the art which will bring about the thorough distribution of the materials such as, for example, by the use of mixing rollers, dough mixers, Banbury mixers, extruders and the like. In one technique for obtaining the intimate dispersion of the pigment and the polyolefins in the polycarbonate, the materials are blended in powder or granular form and thereafter extruded until pelletized to obtain the desired colored pellets. In a second technique the polyolefin in the form of granules or pellets may be introduced simultaneously with a polycarbonate solution and a pigment dispersion into a devolatilizing extruder containing one or more vents to remove the solvent by evaporation, and the resulting material can then be extruded and pelletized if desired. In still another technique the pigment may be dry blended with the polyolefin and extruded to form pellets and these pellets then blended with the polycarbonate and re-extruded to form strands which may be pelletized.

The pigment may be mixed with either the polycarbonate, the polyolefin or all three components may be simultaneously mixed. In one method a master batch of the pigment in a small quantity of polycarbonate or polyolefin or both may be prepared. In this technique, a large quantity of pigment is dispersed with the host material whether it be polycarbonate, polyolefin, or a mixture of the two to form a very concentrated color body. These may be in the form of pellets produced in an extrusion method or any other suitable form. In subsequent preparation to produce the final desired color, a small portion of the master batch is mixed with a larger quantity of polycarbonate resin or a blend of the polycarbonate and polyolefin resin to achieve the proper concentration of each of the ingredients.

Any suitable polycarbonate resin such as those disclosed in U.S. Patents Nos. 2,964,794, 3,028,365, 3,153,008, 3,187,065 and 3,215,668 may be used. For example, in U.S. Patent No. 3,028,365, polycarbonates are obtained by reacting di(monohydroxyaryl)alkanes with derivatives of a carbonic acid selected from the group consisting of carbonic acid diesters, phosgene, and bis-chloro-carbonic acid esters of di(monohydroxyaryl)alkanes. The di(monohydroxyaryl)alkanes can be re-esterified with carbonic acid diesters, e.g., dimethyl, diethyl, dipropyl, dibutyl, diamyl, dioctyl, dicyclohexyl, diphenyl and di- o-, p-tolyl carbonate at elevated temperatures from about 50 to about 320° C. and especially from about 120° C. to about 280° C.

The polycarbonates can also be prepared by introducing phosgene into solutions of di(monohydroxyaryl)alkanes in organic bases, such as dimethyl aniline, diethyl aniline, triethyl amine, and pyridine or into solutions of di(monohydroxyaryl)alkanes in indifferent organic solvent, such as benzene, ligroin, cyclohexane, methylcyclohexane, toluene, xylene, chloroform, methylene chloride, carbon tetrachloride, trichloro ethylene, dichloro ethane, methyl acetate and ethyl acetate with the addition of an acid binding agent as mentioned above.

A process particularly suitable for producing polycarbonates consists in introducing phosgene into an aqueous solution or suspension of alkali metal salts, such as, lithium, sodium, potassium, and calcium salts of the di(monohydroxyaryl)alkanes, preferably in the presence of an excess of a base such as lithium, sodium, potassium, and calcium hydroxide or carbonate. The polycarbonate precipitates out from the aqueous solution. The conversion in the aqueous solution is promoted by the addition of indifferent solvents of the kind mentioned above which are capable of dissolving phosgene and eventually the produced polycarbonate.

In addition, polymeric materials containing a multiplicity of urethane and carbonate linkages in random or block distribution may be prepared by reacting a bis-chloroformate of a bis-phenol with a diamine and dihydroxy compound which contains two hydroxy groups capable of reacting with chloroformate to form the carbonate esters. Likewise, aromatic, aliphatic or aryliphatic diisocyanates may be reacted with a di(monohydroxyaryl)alkane which is then reacted with an additional quantity of a di(monohydroxyaryl)alkane and phosgene.

These high molecular weight polycarbonates may be produced from a great number of dihydroxy compounds, that is, of aliphatic, cycloaliphatic and aromatic dihydroxy compounds, preferably from aromatic dihydroxy compounds. The preferred high molecular weight polycarbonates thus formed may be represented by the formula

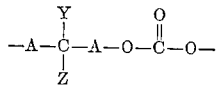

wherein each —A— is selected from the group consisting of phenylene, halo substituted phenylene and alkyl substituted phenylene and Y and Z are each selected from the group consisting of hydrogen, hydrocarbon radicals free from aliphatic unsaturation and of radicals which together and with the adjoining carbon atom form a cycloalkane radical and the total number of carbon atoms in Y and Z being up to about 12.

Examples of the aromatic compounds are di(monohydroxyaryl)alkanes, di(monohydroxyaryl)sulphones, di(monohydroxyaryl)ethers, and di(monohydroxyaryl)thioethers. The above aryl radicals may be the same or different and in addition, they may have substituents such as halogens, and/or alkyl radicals. The radical linking the benzene ring of the di(monohydroxyaryl)alkanes may be alkyl, cycloalkyl or aryl.

Representative of these aromatic dihydroxy compounds are hydroquinone, resorcinol, pyrocatechol, 4,4'-dihydroxydiphenylene, 2,2'-dihydroxydiphenylene, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxy anthracene, and o-, m- and p-hydroxy benzyl alcohol and the like. Preferred classes of aromatic dihydroxy compounds are the di(monohydroxyaryl)alkanes such as 1,1-bis-(4-hydroxyphenyl)ethane,
1,1-bis-(4-hydroxyphenyl)-butane,
1,1-bis(4-hydroxyphenyl)-2-methylpropane,
1,1-bis-(4-hydroxyphenyl)-heptane,
1,1-bis-(4-hydroxyphenyl)-1-phenyl-methane,
bis-(4-hydroxyphenyl)-4-methylphenyl-methane,
bis-(4-hydroxyphenyl)-4-ethyl-phenyl-methane,
bis-(4-hydroxyphenyl)-4-isopropylphenyl-methane,
bis-(4-hydroxyphenyl)-4-butylphenyl-methane,
bis-(4-hydroxyphenyl)-benzyl methane,
bis-(4-hydroxyphenyl)-alpha-furyl-methane,
2,2-bis-(4-hydroxyphenyl)-propane,
2,2-bis-(4-hydroxyphenylene)-butane,
2,2-bis-(4-hydroxyphenyl)-pentane,
2,2-bis-(4-hydroxyphenyl)-4-methyl-pentane,
2,2-bis-(4-hydroxyphenyl)-octane,
1,1-bis-(4-hydroxyphenyl)-1-phenyl ethane,
3,3-bis-(4-hydroxyphenyl)pentane,
2,2-bis-(4-hydroxyphenyl)-decahydronaphthalene,
2,2-bis-(4-hydroxy-3-cyclohexylphenyl)-propane,
2,2-bis-(4-hydroxy-3-butyl-phenyl)-propane,
1,1-bis-(4-hydroxy-3-methyl-6-butylphenyl)-butane,
1,1-bis-(4-hydroxy-3-methyl-6-tertiary-butylphenyl)-butane,
1,1-bis-(4-hydroxy-3-methyl-6-tertiary-butylphenyl)-heptane,
1,1-bis-(4-hydroxy-3-methyl-6-tertiary-butylphenyl)-2-ethyl-2-hexane.

Other aromatic dihydroxy compounds are the di(monohydroxyaryl)sulphones such as bis-(4-hydroxyphenyl)-sulphone,
bis-(2-hydroxyphenyl)sulphone,
bis-(3-hydroxyphenyl)-sulphone,
bis-(4-hydroxy-2-methylphenyl)sulphone,
bis-(4-hydroxy-3-methylphenyl)sulphone,
bis-(2-hydroxy-4-methylphenyl)sulphone,
bis-(4-hydroxy-2-ethylphenyl)-sulphone,
bis-(4-hydroxy-3-ethylphenyl)sulphone,
bis-(4-hydroxy-2-tertiary-butylphenyl)sulphone,
bis-(4-hydroxy-3-tertiary-butylphenyl)-sulphone, and
bis-(2-hydroxy-1-naphthyl)sulphone.

Dihydroxy aromatic ethers such as p,p'-dihydroxydiphenyl ether, p,p'-dihydroxytriphenylether, the 4,3'-, 4,2'-4,1'-, 2,2'-, 2,3'-, etc., dihydroxy ethers may also be used. Examples of other ethers are bis-(4-hydroxy-3-isobutylphenyl)-ether, 4,4'-dihydroxy-2,6-dimethyldiphenyl ether, 4,4' - dihydroxy - 2,5 - dimethyldiphenyl ether, 4,4'-dihydroxy-3,2-dinitrodiphenyl ether and the like.

Among the great number of suitable di(monohydroxyaryl)-alkanes, the bis-(4-hydroxyphenyl) alkanes are preferred, especially 2,2-bis-(4-hydroxyphenyl)-propane.

Suitable examples of aliphatic dihydroxy compounds are ethylene glycol, diethylene glycol, triethylene glycol, polyethylene glycol, thiodiglycol, ethylene dithiodiglycol, the di- and poly-glycols produced from propylene oxide- 1,2, o-, m-, and p-xylene glycol, propanediol-1,3, butanediol-1,3, butanediol-1,4, 2-methylpropanediol-1,3, pentanediol - 1,5, 2 - ethylpropanediol - 1,3, hexanediol-1,6, octanediol-1,8, 1-ethylhexanediol-1,3, and decanediol-1,10.

Examples of the cycloaliphatic dihydroxy compounds are cyclohexanediol-1,4, cyclohexanediol-1,2, 2,2-bis-(4-hydroxy-cyclohexyl)-propane, and 2,6-dihydroxydecahydronaphthalene.

In the production of polycarbonates according to the various processes, it is advantageous to employ small amounts of reducing agents, for example, sodium or potassium sulphide, -sulphite, and -dithionite or free phenol and p-tertiarybutylphenol.

By adding monofunctional compounds which are capable of reacting with phosgene or with the end groups of the polycarbonate consisting of the chlorocarbonic acid ester group and which terminate the chains, such as phenols, for instance, a phenol, tertiary butyl phenol, cyclohexyl phenol and 2,2 - (4,4 - hydroxyphenyl - 4'-methoxyphenyl)-propane and other monofunctional compounds such as aniline and methyl aniline, it is possible to regulate the molecular weight of the polycarbonate.

The body protective device in accordance with this invention, such as, for example, riot shields, safety helmets, shin guards, shoulder pads, hip pads, and the like, are prepared by utilizing conventional techniques for forming thermoplastic resins including compression molding, vacuum forming, injection molding, and the like. The preferred method because of the speed of fabrication and the number of articles that are prepared simultaneously is injection molding. In a suitable procedure for injection molding safety helmets, the resin is heated to from about 550 to about 730° F. and injected at a pressure of from about 15,000 to 22,000 p.s.i.g. into a mold maintained at a temperature of from about 100 to 160° F. The entire molding cycle requires about 40 to 80 seconds.

The invention will be further illustrated by the following examples in which parts are by weight unless otherwise specified.

EXAMPLE 1—CONTROL

A polycarbonate prepared from bis-phenol A and phosgene in accordance with U.S. Patent No. 3,028,365 and having a molecular weight of 38,500 is injection molded to produce a fire hat at 700° F. into a mold maintained at 150° F. The injection requires about 8 seconds and is held in the mold for about 20 seconds. The pressure of injection is about 20,000 p.s.i.g. The polycarbonate utilized when prepared into bars exhibits a ⅛″ Izod impact of 16 and a ¼″ Izod impact of 3.3. The critical thickness is 247 mils. The fire hats are removed from the mold and aged for a period of 15 hours at 250° F. It is found that the critical thickness has decreased to a point where seven of ten helmets pass a hammer test which consists of hitting the helmets twenty times with a 20-ounce hammer.

EXAMPLE 2—CONTROL

The procedure of Example 1 is repeated, however, the polycarbonate injection molded into helmets contains 0.8% of a mixture of pigments comprising 43% titanium dioxide, 39.2% of golden cadmium yellow concentrated X–2824, 16.6% deep cadmium orange, X–2326, and 1.2% PDS 161 B–192 Dilute Black. The ⅛″ Izod impact of this mixture of polycarbonate and pigment is 16.3 and the ¼″ Izod impact is 2.7. The critical thickness is 200 mils. After the aging period set forth in Example 1, only one of ten helmets passes the hammer test.

EXAMPLE 3

The procedure of Example 2 is followed with the exception that 5% of a polyethylene having a density of 0.945 gram/cc. and a melt index of 0.6 is incorporated by dry blending and extrusion into pellets. This combination has a ⅛″ Izod impact of 12.9 and a ¼″ Izod impact of 12.4. The critical thickness is 282 mils. The fire hats are molded in accordance with the conditions of Example 1 and upon removal from the mold are aged 15 hours at 250° F. Upon conducting the hammer test, 100% of the helmets pass.

EXAMPLE 4—CONTROL

A polycarbonate having a molecular weight of 35,500 and prepared in accordance with U.S. Patent No. 3,028,-365 is injection molded to prepare a fireman's helmet at a temperature of about 700° F. into a mold having the desired configuration and maintained at a temperature of about 150° F. The injection cycle is the same as that set forth in Example 1. Upon removal from the mold the helmets are aged for 15 hours at 250° F. and subjected to the hammer test. Out of ten helmets so prepared, none pass the hammer test.

EXAMPLE 5—CONTROL

The procedure of Example 4 is repeated, however, 0.74% based on the weight of the polycarbonate of a mixture of the pigments set forth in Example 2. The helmets are injection molded following the procedure set forth in Example 4. The pigmented polycarbonate has a ⅛″ Izod impact of 16.6 and a ¼″ Izod impact of 3. The critical thickness is 145. After removal of the helmets from the injection mold they are aged for 15 hours at 250° F. Out of ten helmets molded, none pass the hammer test.

EXAMPLE 6

The procedure of Example 5 is repeated, however, five parts by weight of a polyethylene polymer having a melt index of 0.6 and a density of 0.945 gram/cc. is mixed into the pigmented polycarbonate composition. The composition exhibits a ⅛″ Izod impact of 12.7 and a ¼″ Izod impact of 11.9. The critical thickness is greater than ¼″. The helmets after molding, are removed, aged and tested in the manner described in Example 1. One hundred percent of the helmets molded pass the hammer test.

EXAMPLE 7

The procedure of Example 6 is once again repeated, however, in place of the polyethylene, five parts by weight of polypropylene polymer having a melt index of 0.7 is used. The composition exhibits a ⅛″ Izod impact of 12.7 and a ¼″ Izod impact of 11.8. The critical thickness is greater than ¼″. The helmets are removed from the mold, aged and tested in the manner set forth in Example 1. One hundred percent of the helmets molded pass the hammer test.

EXAMPLE 8—CONTROL

A natural polycarbonate having a molecular weight of 32,500 is molded according to the procedures of Example 1 except the resin is molded in the injection molding device at an average temperature of about 625° F. This natural polycarbonate exhibits a ⅛″ Izod impact of 16.1 and a ¼″ Izod impact of 2.5, and therefore has a critical thickness of somewhere between ⅛″ and ¼″. The helmets after molding and an aging period of 15 hours at 250° F. do not pass the hammer test.

EXAMPLE 9—CONTROL

The procedure of Example 8 is repeated, however, 0.96% based on the weight of the polycarbonate of a pigment comprising 99.3% of titanium dioxide and 0.7% of PDS 161 B–192 Dilute Black is combined. The pigmented polycarbonate exhibits a ⅛″ Izod impact of 17.1 and a ¼″ Izod impact of 1.8 and has a critical thickness of 143 mils. The helmets are molded in the same manner as in Example 8 and upon testing after aging all of those prepared failed.

EXAMPLE 10

The procedure of Example 9 is repeated with the exception that 5% based on the weight of polycarbonate of polyethylene having a melt index of 0.6 and a density of 0.945 gram/cc. is added to the pigmented polycarbonate. This combination exhibits a critical thickness greater than ¼″. After removing the helmets from the mold, aging for 15 hours at 250° F. and testing in the manner described in Example 1, all of the helmets prepared pass the test.

EXAMPLE 11—CONTROL

A natural polycarbonate having a molecular weight of 28,500 is molded into a fireman's helmet generally following the procedure of Example 1, however, an average temperature of about 600° F. is maintained in the injection molding device. The remaining conditions are the same as those of Example 1. The ⅛″ Izod impact of this polycarbonate is 15 and the ¼″ Izod impact at 2.2. Upon removing the helmets from the mold they are tested after an aging procedure of 15 hours at 250° F. None of those prepared pass the hammer test.

EXAMPLE 12—CONTROL

The procedure of Example 11 is once again conducted, however, 0.74% of the pigment composition of Example 3 is added. The mounting cycle and other conditions of Example 11 are followed and upon testing, none of the helmets thus prepared pass the hammer test.

EXAMPLE 13

The procedure of Example 12 is followed with the exception that 5% based on the weight of the polycarbonate of a polyethylene having a melt index of 3.5 and a density of 0.95 is added. This composition exhibits a ⅛″ Izod impact of 13 and a ¼″ Izod impact of 9. The critical thickness is greater than ¼″. Two runs are made with this composition, one at an average cylinder temperature in the injection molding device of about 700° F. and the other at an average cylinder temperature of about 600° F. In each case the helmets upon removal from the mold are subjected to an aging procedure of 15 hours at 250° F. Upon conducting the hammer test, all of those molded at each temperature pass the hammer test.

The examples clearly indicate the improved body protective devices in accordance with the invention. An important feature of body protective devices including safety helmets is the confidence with which one can wear or carry the device. The body protective devices heretofore prepared from polycarbonate suffered from the disadvantage that one could never be sure that the device would offer the prescribed degree of protection. One utilizing a device in accordance with the invention need have no such fear.

In accordance with the invention, the drawing illustrates one embodiment of a body protective device shown as a safety helmet 11 having a crown portion 13 and a brim extending in one direction to form a visor 50, integral with the crown portion 13. The entire helmet is molded of a polycarbonate plastic having incorporated therein a polyolefin.

Although the invention has been described in considerable detail in the foregoing discussion for the purpose of illustration, it is to be understood that variations can be made by those skilled in the art without departing from the spirit of the invention and scope of the claims.

What is claimed is:

1. A body protective shell of a polycarbonate resin having incorporated therein from about 0.2 to about 5% by weight pigments and from about 3% to about 7% by weight of a polyolefin polymer, said polycarbonate resin containing said pigment and said polyolefin polymer having a critical thickness after an accelerated aging period of 15 hours at 250° F. of at least ¼″, said shell having an average thickness of from about 0.02″ to about 0.2″, said polycarbonate having a molecular weight of from about 25,000 to about 40,000.

2. The body protective shell of claim 1 in the shape of a safety helmet.

3. The protective shell of claim 1 wherein the polyolefin is polyethylene.

4. The protective shell of claim 3 wherein the polyethylene has a density of from about 0.93 to about 0.95 and a melt index of about 0.6 to about 15.

5. The protective shell of claim 1 wherein the polyolefin is polypropylene.

6. The protective shell of claim 1 where the polyolefin is a mixture of polyethylene and polypropylene.

7. The body protective device of claim 1 wherein the polycarbonate resin is prepared from a di(monohydroxyaryl) alkane and a derivative of carbonic acid.

8. The body protective shell of claim 1 wherein the pigment is used in an amount of from about 0.2 to 3% by weight.

References Cited

UNITED STATES PATENTS 3,221,080  11/1965  Fox _____ 260—37 X

MORRIS LIEBMAN, Primary Examiner.

L. T. JACOBS, Assistant Examiner.

U.S. Cl. X.R.

2—3; 260—873, 896, 897